US011119485B1

(12) United States Patent
Barsamian

(10) Patent No.: US 11,119,485 B1
(45) Date of Patent: Sep. 14, 2021

(54) DRONE OPERATIONAL ADVISORY ENGINE

(71) Applicant: Accenture Global Solutions Limited, Dublin (IE)

(72) Inventor: Paul Barsamian, Glenview, IL (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/065,448

(22) Filed: Oct. 7, 2020

(51) Int. Cl.
| | |
|---|---|
| *G05D 1/00* | (2006.01) |
| *B64C 39/02* | (2006.01) |
| *G05D 1/10* | (2006.01) |
| *G08G 5/00* | (2006.01) |
| *G06K 9/00* | (2006.01) |
| *G08G 5/04* | (2006.01) |

(52) U.S. Cl.
CPC ......... *G05D 1/0088* (2013.01); *B64C 39/024* (2013.01); *G05D 1/1062* (2019.05); *G05D 1/1064* (2019.05); *G06K 9/00637* (2013.01); *G06K 9/00651* (2013.01); *G06K 9/00657* (2013.01); *G06K 9/00664* (2013.01); *G08G 5/003* (2013.01); *G08G 5/0069* (2013.01); *G08G 5/04* (2013.01); *B64C 2201/141* (2013.01)

(58) Field of Classification Search
CPC ...... B25J 9/0084; B25J 9/1682; B25J 9/1689; G05B 19/4186; G05D 2201/0211; G06Q 10/06; H04N 7/142; H04N 7/15; Y10S 901/01; Y10S 901/47; F01P 3/22; F01P 9/00
See application file for complete search history.

(56) References Cited

U.S. PATENT DOCUMENTS

| | | | | |
|---|---|---|---|---|
| 6,122,572 A | * | 9/2000 | Yavnai | G05D 1/0088 342/13 |
| 6,374,155 B1 | * | 4/2002 | Wallach | G05D 1/0274 700/245 |
| 7,117,067 B2 | * | 10/2006 | McLurkin | G05D 1/0297 700/245 |

(Continued)

OTHER PUBLICATIONS https://kittyhawk.io/feature/pre-flight-planning/.
https://www.measure.com.
https://hazondms.com/.

*Primary Examiner* — Bhavesh V Amin
(74) *Attorney, Agent, or Firm* — Norton Rose Fulbright US LLP

(57) ABSTRACT

Embodiments of the present disclosure provide systems and methods for providing functionality that enables automated generation of advisory and guidance data for designing, managing, and executing UAS flight operations. According to the present disclosure, a location analytics engine may perform analysis and provide requirements based on location, and a technology analytics engine may be provided to determine which UAS platform, sensors, and other technology (e.g., other equipment such as parachutes, etc.) that may be required to perform the desired UAS operations. In embodiments, a mission operational relationships engine may correlate various data associated with the industry, mission type, regulatory environment, location, etc., in order to identify relationship between the various data and determine requirements. An operational advisory engine may leverage the other engines in order to generate the advisory and guidance data.

20 Claims, 4 Drawing Sheets

(56) References Cited

U.S. PATENT DOCUMENTS

| | | | | |
|---|---|---|---|---|
| 7,123,169 B2* | 10/2006 | Farmer | G01S 7/003 | |
| | | | 340/945 | |
| 7,451,023 B2* | 11/2008 | Appleby | G05D 1/0088 | |
| | | | 701/120 | |
| 7,765,028 B2* | 7/2010 | Orita | G05D 1/0088 | |
| | | | 700/248 | |
| 7,778,744 B2* | 8/2010 | Rath | G05D 1/101 | |
| | | | 701/3 | |
| 7,970,506 B2* | 6/2011 | DeMarco | G05D 1/104 | |
| | | | 701/23 | |
| 8,103,398 B2* | 1/2012 | Duggan | G05D 1/0061 | |
| | | | 701/24 | |
| 8,285,417 B2* | 10/2012 | Kawaguchi | G05D 1/0217 | |
| | | | 700/248 | |
| 8,355,834 B2* | 1/2013 | Duggan | G05D 1/0088 | |
| | | | 701/24 | |
| 8,428,777 B1* | 4/2013 | Poursohi | G05B 19/41865 | |
| | | | 700/248 | |
| 8,543,255 B2* | 9/2013 | Wood | G05D 1/0088 | |
| | | | 701/2 | |
| 8,644,512 B2* | 2/2014 | Khazan | H04W 56/0045 | |
| | | | 380/258 | |
| 8,838,289 B2* | 9/2014 | Margolin | G05D 1/0044 | |
| | | | 701/2 | |
| 8,886,459 B2* | 11/2014 | Stefani | G01C 21/00 | |
| | | | 701/519 | |
| 9,008,839 B1* | 4/2015 | Kuffner, Jr. | G05B 19/4187 | |
| | | | 700/248 | |
| 9,064,222 B2* | 6/2015 | Saad | G05D 1/00 | |
| 9,105,184 B2* | 8/2015 | Stefani | G08G 5/0013 | |
| 9,311,760 B2* | 4/2016 | Downey | G08G 5/0069 | |
| 9,412,278 B1* | 8/2016 | Gong | G08G 5/0091 | |
| 9,466,219 B1* | 10/2016 | Stefani | G08G 5/0026 | |
| 9,505,494 B1* | 11/2016 | Marlow | B64C 39/024 | |
| 9,527,587 B2* | 12/2016 | Levien | B64C 39/024 | |
| 9,547,311 B2* | 1/2017 | Tamir | G05D 1/0088 | |
| 9,567,074 B2* | 2/2017 | Levien | G08G 5/0082 | |
| 9,567,077 B2* | 2/2017 | Mullan | G05D 1/0088 | |
| 9,651,944 B2* | 5/2017 | Arwine | G06F 21/6209 | |
| 9,651,945 B1* | 5/2017 | Erickson | G08G 5/0069 | |
| 9,685,088 B2* | 6/2017 | Trent | G06Q 10/047 | |
| 9,688,403 B2* | 6/2017 | Winn | B64C 39/024 | |
| 9,734,723 B1* | 8/2017 | Bruno | G08G 5/0056 | |
| 9,740,200 B2* | 8/2017 | Bethke | G08G 5/0013 | |
| 9,792,557 B2* | 10/2017 | Mathur | G06Q 50/02 | |
| 9,792,613 B2* | 10/2017 | Gong | G06Q 30/018 | |
| 9,805,372 B2* | 10/2017 | Gong | G08G 5/0034 | |
| 9,805,607 B2* | 10/2017 | Gong | G06F 21/6227 | |
| 9,821,455 B1* | 11/2017 | Bareddy | B25J 9/0084 | |
| 9,847,032 B2* | 12/2017 | Postrel | H04W 4/46 | |
| 9,862,089 B2* | 1/2018 | Kuffner, Jr. | G05B 19/4187 | |
| 9,870,566 B2* | 1/2018 | Gong | G08G 5/0091 | |
| 9,886,862 B1* | 2/2018 | Burgess | G08G 5/0026 | |
| 9,922,282 B2* | 3/2018 | Weller | B64F 5/10 | |
| 9,933,780 B2* | 4/2018 | Chau | G05D 1/0061 | |
| 9,959,507 B2* | 5/2018 | Mathur | A01G 22/00 | |
| 10,031,529 B2* | 7/2018 | Mullan | G05D 1/104 | |
| 10,043,397 B2* | 8/2018 | Salentiny | G08G 5/0034 | |
| 10,049,583 B2* | 8/2018 | Salentiny | G08G 5/0091 | |
| 10,067,510 B2* | 9/2018 | Mullan | B64C 39/024 | |
| 10,173,320 B1* | 1/2019 | Prisament | G05B 23/0227 | |
| 10,265,844 B2* | 4/2019 | Cheng | B25J 9/08 | |
| 10,296,862 B1* | 5/2019 | Oddo | G06Q 10/06395 | |
| 10,341,253 B2* | 7/2019 | Monda | H04L 47/829 | |
| 10,409,291 B2* | 9/2019 | Baughman | B25J 9/1661 | |
| 10,410,291 B1* | 9/2019 | Binion | G07C 5/008 | |
| 10,548,257 B2* | 2/2020 | Koutsorodi | G05B 19/042 | |
| 10,684,619 B2* | 6/2020 | Kuhara | G05D 1/0033 | |
| 10,741,088 B1* | 8/2020 | Walker | G08G 5/0021 | |
| 10,872,533 B1* | 12/2020 | Walker | B64C 39/024 | |
| 2003/0225489 A1* | 12/2003 | Tsao | B64C 13/18 | |
| | | | 701/9 | |
| 2006/0184292 A1* | 8/2006 | Appleby | F41H 13/00 | |
| | | | 701/23 | |
| 2007/0021880 A1* | 1/2007 | Appleby | G05D 1/0088 | |
| | | | 701/23 | |
| 2007/0168090 A1* | 7/2007 | DeMarco | G08G 5/0086 | |
| | | | 701/23 | |
| 2009/0012661 A1* | 1/2009 | Louis | G08G 5/006 | |
| | | | 701/9 | |
| 2010/0084513 A1* | 4/2010 | Gariepy | B64C 39/024 | |
| | | | 244/190 | |
| 2010/0094500 A1* | 4/2010 | Jin | G01C 21/26 | |
| | | | 701/31.4 | |
| 2010/0145514 A1* | 6/2010 | Kim | B25J 9/1661 | |
| | | | 700/248 | |
| 2011/0166701 A1* | 7/2011 | Thacher | A01G 25/00 | |
| | | | 700/245 | |
| 2011/0288684 A1* | 11/2011 | Farlow | G05D 1/0038 | |
| | | | 700/264 | |
| 2013/0289858 A1* | 10/2013 | Mangiat | G05D 1/0027 | |
| | | | 701/117 | |
| 2014/0022051 A1* | 1/2014 | Levien | G05D 1/0202 | |
| | | | 340/5.2 | |
| 2014/0024999 A1* | 1/2014 | Levien | G16H 40/67 | |
| | | | 604/66 | |
| 2014/0163852 A1* | 6/2014 | Borri | G08G 5/0026 | |
| | | | 701/120 | |
| 2014/0172193 A1* | 6/2014 | Levien | B64C 39/024 | |
| | | | 701/2 | |
| 2014/0172194 A1* | 6/2014 | Levien | G08G 5/0091 | |
| | | | 701/2 | |
| 2014/0192193 A1* | 7/2014 | Zufferey | H04N 7/183 | |
| | | | 348/144 | |
| 2014/0222248 A1* | 8/2014 | Levien | B64C 39/024 | |
| | | | 701/2 | |
| 2014/0257692 A1* | 9/2014 | Stefani | G01C 21/00 | |
| | | | 701/519 | |
| 2014/0316616 A1* | 10/2014 | Kugelmass | G06T 11/206 | |
| | | | 701/8 | |
| 2014/0324253 A1* | 10/2014 | Duggan | G05D 1/0088 | |
| | | | 701/3 | |
| 2015/0025927 A1* | 1/2015 | Hershey | G06Q 10/063112 | |
| | | | 705/7.14 | |
| 2015/0142211 A1* | 5/2015 | Shehata | H04W 4/42 | |
| | | | 701/2 | |
| 2015/0170524 A1* | 6/2015 | Stefani | G05D 1/0027 | |
| | | | 701/120 | |
| 2015/0234387 A1* | 8/2015 | Mullan | G05D 1/104 | |
| | | | 701/3 | |
| 2015/0254988 A1* | 9/2015 | Wang | G08G 5/0082 | |
| | | | 701/3 | |
| 2015/0278734 A1* | 10/2015 | Grant | E21B 41/0092 | |
| | | | 705/7.23 | |
| 2015/0325064 A1* | 11/2015 | Downey | G07C 5/0808 | |
| | | | 701/29.3 | |
| 2015/0336668 A1* | 11/2015 | Pasko | B64C 39/024 | |
| | | | 701/2 | |
| 2015/0379874 A1* | 12/2015 | Ubhi | G05D 1/106 | |
| | | | 701/3 | |
| 2016/0111006 A1* | 4/2016 | Srivastava | G08G 5/0026 | |
| | | | 701/3 | |
| 2016/0125068 A1* | 5/2016 | Dongieux | G06Q 10/063114 | |
| | | | 707/740 | |
| 2016/0140851 A1* | 5/2016 | Levy | G08G 5/045 | |
| | | | 701/3 | |
| 2016/0202227 A1* | 7/2016 | Mathur | G01N 33/24 | |
| | | | 702/2 | |
| 2016/0225263 A1* | 8/2016 | Salentiny | G08G 5/003 | |
| 2016/0232721 A1* | 8/2016 | Singh | G07C 5/008 | |
| 2016/0247404 A1* | 8/2016 | Srivastava | G08G 5/0091 | |
| 2016/0253595 A1* | 9/2016 | Mathur | A01G 22/00 | |
| | | | 706/12 | |
| 2016/0253908 A1* | 9/2016 | Chambers | G08G 5/006 | |
| | | | 701/2 | |
| 2016/0260331 A1* | 9/2016 | Salentiny | G08G 5/0013 | |
| 2016/0275801 A1* | 9/2016 | Kopardekar | G08G 5/0069 | |
| 2016/0288905 A1* | 10/2016 | Gong | G06F 8/65 |

(56) References Cited

U.S. PATENT DOCUMENTS

| | | | |
|---|---|---|---|
| 2016/0292403 A1* | 10/2016 | Gong | G08G 5/0078 |
| 2016/0292696 A1* | 10/2016 | Gong | G08G 5/0052 |
| 2016/0307449 A1* | 10/2016 | Gordon | G06Q 30/0635 |
| 2016/0357183 A1* | 12/2016 | Shaw | G05D 1/0027 |
| 2016/0370800 A1* | 12/2016 | Chau | G05D 1/0088 |
| 2017/0083979 A1* | 3/2017 | Winn | H04L 67/32 |
| 2017/0108876 A1* | 4/2017 | Mullan | B64C 39/024 |
| 2017/0169713 A1* | 6/2017 | Gong | G06F 16/29 |
| 2017/0206790 A1* | 7/2017 | Reddy | G08G 5/0008 |
| 2017/0227470 A1* | 8/2017 | Cesarano | G05D 1/0088 |
| 2017/0247108 A1* | 8/2017 | Ljubuncic | G06K 9/2063 |
| 2017/0277203 A1* | 9/2017 | Castillo-Effen | G06Q 10/06 |
| 2017/0337826 A1* | 11/2017 | Moran | G05D 1/0088 |
| 2017/0372617 A1* | 12/2017 | Bruno | G08G 5/025 |
| 2018/0027725 A1* | 2/2018 | Koutsorodi | G01S 19/14 |
| 2018/0045522 A1* | 2/2018 | Aziz | G08G 5/0047 |
| 2018/0068567 A1* | 3/2018 | Gong | G08G 5/0034 |
| 2018/0082308 A1* | 3/2018 | Gong | G08G 5/0026 |
| 2018/0093769 A1* | 4/2018 | Sequeira | G01S 13/888 |
| 2018/0096609 A1* | 4/2018 | de la Cruz | G08G 5/0034 |
| 2018/0111683 A1* | 4/2018 | Di Benedetto | G06Q 30/04 |
| 2018/0157255 A1* | 6/2018 | Halverson | B64C 39/024 |
| 2018/0211263 A1* | 7/2018 | Gong | G06F 21/6227 |
| 2018/0224854 A1* | 8/2018 | Mullan | B64C 39/024 |
| 2018/0293898 A1* | 10/2018 | Redmann | G08G 5/006 |
| 2018/0362190 A1* | 12/2018 | Chambers | B64C 39/024 |
| 2019/0012922 A1* | 1/2019 | Selander | G08G 5/0013 |
| 2019/0051190 A1* | 2/2019 | Russell | G05D 1/0027 |
| 2019/0068829 A1* | 2/2019 | Van Schoyck | G01C 21/165 |
| 2019/0102689 A1* | 4/2019 | Lassoued | G06N 20/00 |
| 2019/0324456 A1* | 10/2019 | Ryan | G05D 1/101 |
| 2019/0325760 A1* | 10/2019 | Priest | G08G 5/0013 |
| 2020/0047337 A1* | 2/2020 | Williams | B25J 9/163 |
| 2020/0072613 A1* | 3/2020 | Kuzmanovic | G08G 5/0034 |
| 2020/0082168 A1* | 3/2020 | Fathi | B64C 39/024 |

\* cited by examiner

DRONE OPERATIONAL ADVISORY ENGINE

TECHNICAL FIELD

The present application relates to unmanned aerial system (UAS)'s operations and more specifically to systems and methods for generating operational advisory data for UAS flight operations.

BACKGROUND

Unmanned aerial systems (UAS), such as drones are used in a lot of use cases and missions today, and their usage continues to increase. There is no question that there is a benefit to using a drone to achieve a particular operational objective. Drones are able to access locations that are not easily accessible to a human, and they are able to carry varied equipment to perform various operations. However, drone operations do not always make sense, due to cost, regulations, other business limitations, technological limitations, etc.

In today's industry, knowing or determining when to use a drone is not easily ascertainable because the industry is not prepared to make those determinations efficiently. Mission planning and requirements are often "punted" to the individual pilots, or third-party pilot groups. The individual pilots are left to choose equipment, sensors, identify airspaces, manage required waivers, manage documentation and compliance, or other tasks. Moreover, flight operations today are focused on a variety of commercial operation types such as NASA's UAS traffic management (UTM) program, which assumes a lot of autonomy but does not address, at all, the procurement, dispatch, compliance, or data retrieval facets of a complete end to end operation for a flight operation involving a UAS. Thus, current operations processes are highly aviation industry focused with little program or process management focus for operating in commercial non-aviation environments. In addition, current operations processes are prone to errors, which can impact safety, reputation, and efficient use of resources.

SUMMARY

The present application discloses systems, methods, and computer-readable storage media providing functionality that provides automated generation of advisory and guidance data for designing, managing, and executing UAS flight operations. In embodiments, the disclosed systems may receive input (e.g., such as from users and operators specifying an industry), and the disclosed systems may provide functionality to select uses cases typically associated with the specified industry, and may provide output such as output specifying succinct requirements for technology, operations, integration, and compliance with aviation standards/laws in order to plan, execute, and manage UAS flight operations. As such, the present disclosure provides a use case and industry focused method for identifying complete technical and operational requirements for UAS flight operations or even a UAS program. In some embodiments, UAS flight operations may be managed using real time relational analysis. In some embodiments, the systems and methods disclosed herein may provide functionality that can be leveraged to process, analyse, and respond to queries related to an industry and associated UAS use cases through an automated system, and the system may provide answers that drive and trigger specific operational activities both manually and through information technology (IT)/data driven automation.

The systems and methods disclosed herein provide API-based tiered analytics and cross-reference processes that receive and analyze information related to UAS resources (e.g., operations, technologies, missions, etc.) and provide advisory and guidance data for designing, managing, and executing UAS flight operations. These advisory data may include consulting and planning data that allow a user to efficiently control and manage UAS resources usage requirements and operations. For example, the advisory and guidance data may be used to generate work orders which may include specific details of UAS operations, including operational, technological, regulatory, and even risk management data. This advisory guidance may be provided via an automated system and may be cross-referenced across industries and use cases.

In aspects, the tiered analytics and cross-reference processes provided by the systems and methods disclosed herein may comprise several engines. For example, in aspects, a location analytics engine may be provided to perform analysis and provide requirements based on location. In addition, a technology analytics engine may be provided to determine which UAS platform, sensors, and other technology (e.g., other equipment such as parachutes, etc.) may be required to perform the desired UAS operations. In some embodiments, a mission operational relationships engine may be provided to correlate various data associated with the industry, mission type, regulatory environment, location, etc., in order to identify relationships between the various data and determine requirements. An operational advisory engine may also be provided which leverages the other engines in order to generate the advisory and guidance data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein.

Figure 1:
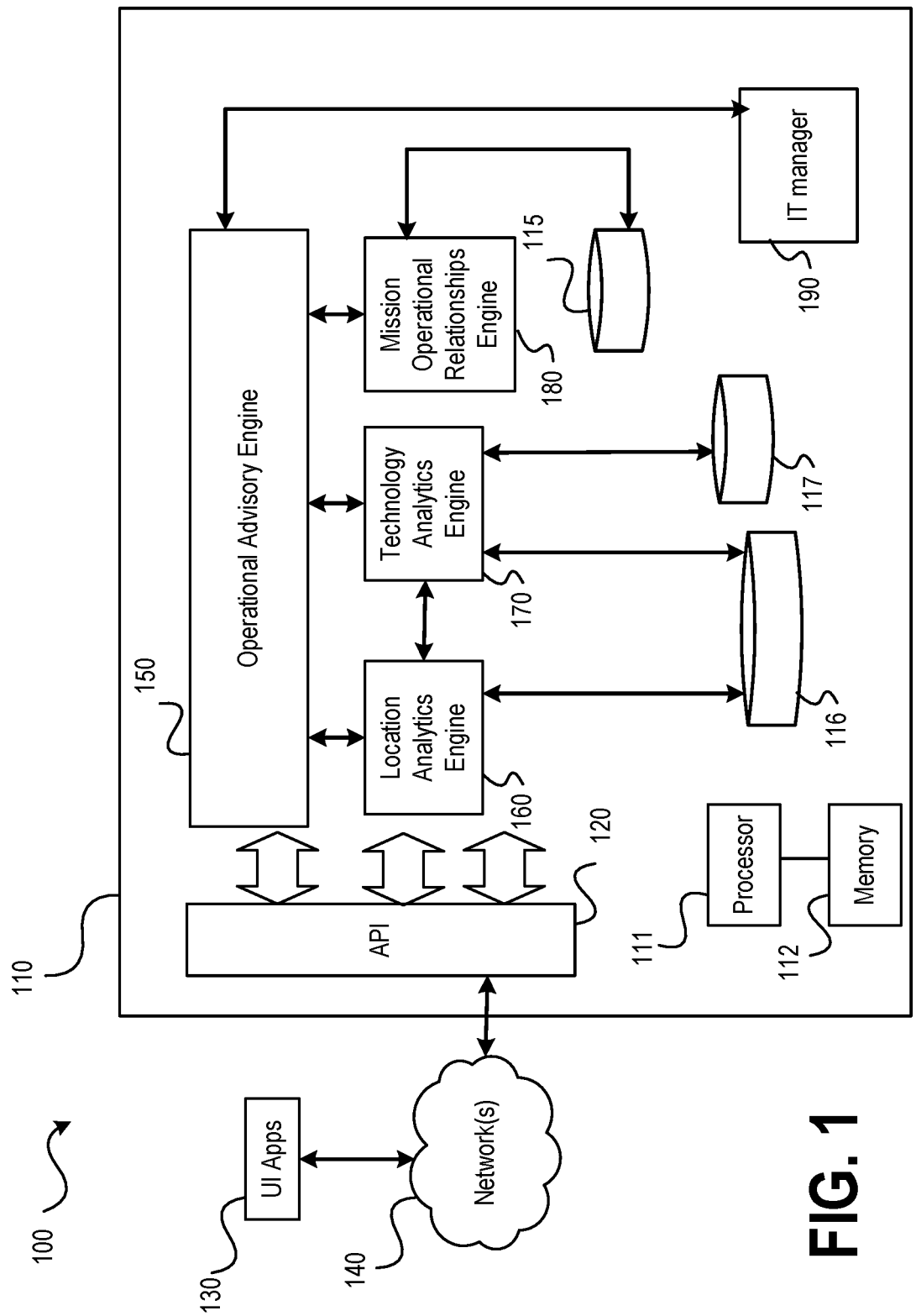
FIG. 1 is a block diagram of a system for providing automated generation of advisory and guidance data for UAS operations in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

The systems and methods disclosed herein provide API-based tiered analytics and cross-reference processes that receive and analyze information related to UAS resources (e.g., operations, technologies, missions, etc.) and provide automated generation of advisory and guidance data for designing, managing, and executing UAS flight operations. The advisory and guidance data may allow a user to efficiently control and manage UAS resources usage requirements and operations. In aspects, the UAS resource usage requirements may be used for guidance purposes, such as to advise and consult on whether a particular UAS resource should or can be used for a particular mission, what UAS resources are required for a particular mission or use case, etc., as will be discussed in more detail below. A particular benefit of the technological improvement provided by the features of the disclosed systems is that operational advisement may be provided in the preplanning stages or near real time, which allows systems managing day to day activities, such as existing information technology (IT) and operational technology (OT) systems, to be efficiently integrated. In aspects, business and budget overviews may be tied to both technologies and operational objectives. Additionally, the disclosed systems and methods may provide features for facilitating control of dispatching of UAS resources, which in some aspects may include both people and automation technologies, where available, at scale with reduced human effort and intervention required.

In some aspects, the disclosed systems provide an improved user interface that facilitates direct integration of a user and user information with the system's features to provide a consulting and planning tool for budget, business case, technology, operational integration, and regulatory requirements based on industry and location related consideration with respect to UAS resources. In aspects, the disclosed systems and techniques also provide an environment (e.g., a development environment) in which various custom interfaces may be developed. These custom interfaces may be developed in order to meet particular business needs. In alternative or additional aspects, the disclosed systems include an enhanced API that provides advisory features and is integrated into the system in a manner which enables dispatch of UAS resources, operational activities, UAS resources fleet management, planning, event management, and other operational and management activities related to UAS resources.

It is noted that as used herein, a UAS resource may refer to unmanned aerial vehicle, and may include an autonomous or ground controlled aircraft such as a drone, a multi-copter, a quad-copter, fixed wing aircraft, etc.

Referring to FIG. 1, a block diagram of a system providing automated control and management of UAS resources operations and coordination in accordance with embodiments of the present disclosure is shown as a system 100. As shown in FIG. 1, system 100 may include server 110, UI apps 130, and network 140. These components, and their individual components, may cooperatively operate to provide functionality in accordance with the discussion herein. For example, in operation according to embodiments, UI apps 130 may facilitate a user interacting with system 100, e.g., via network 140, to execute and leverage the features provided by server 100, as will be discussed in more detail below, in order to provide user and UAS resource data to server 110. The various components of server 110 may cooperatively operate to analyze the data provided by the user, and may apply rules, algorithms, machine learning algorithms, and other analytical processes, as described below, and may integrate data from various modules and databases, in order to generate and provide advisory, consulting, and planning data, which the user may then use to manage UAS resources and to make decisions related to the use and/or deployment of the UAS resources. In some embodiments, the process performed by server 110 may be automated, although a user may initiate the process.

What follows is a more detailed discussion of the functional blocks of system 100 shown in FIG. 1. However, it is noted that the functional blocks, and components thereof, of system 100 of embodiments of the present invention may be implemented using processors, electronic devices, hardware devices, electronic components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for performing the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

It is further noted that functionalities described with reference to each of the different functional blocks of system 100 described herein is provided for purposes of illustration, rather than by way of limitation and that functionalities described as being provided by different functional blocks may be combined into a single component or may be provided via computing resources disposed in a cloud-based environment accessible over a network, such as one of network 140.

In some aspects, server 110 and UI apps 130 may be communicatively coupled via network 140. Network 140 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc.

UI apps 130 may include programs, applications, and/or any other software configured to interact with server 110 and to provide an interface for a user to initiate a process in accordance with the present description or to provide input, such as data and/or information on UAS resources, flight operations and/or mission requirements, location data, industry data, technology data, etc., that may be provided to server 110 for analysis and generation of advisory data in accordance with the features of system 100. In some embodiments, UI apps 130 may include a survey web application, which may be an application, a webpage, a standalone program, which may be structured and/or configured to enable system 100 to query, from a user or another system, information relevant to the setup and management of system 100, and to enable a user or another system to provide such information. For example, in some implementations, the survey web application may interface with API 120 to enable a user to provide system 100 with information such as the relevant industry (e.g., for a particular use case), typical use cases for particular industries, types of equipment required for a particular operation, certification waivers, authorizations required, software and processing service recommendations, mission location data (e.g., geographic location, climate, geographic level (e.g., state, county, etc.), airspace compliance requirements), site requirements, business case suggestions and drivers for budgets and planning, risk management data, integration points with existing IT and OT processes, etc. In some embodiments, the web application may function as an application version of the advisory engine, and may be geared towards users and/or operators who may be program managers and/or building business cases and may enable expansion of their programs.

In some embodiments, UI apps 130 may include a work order management and dispatch application. The work order management and dispatch application may be an application, a webpage, a standalone program. In some embodiments, the work order management and dispatch application may represent one or more existing applications and enterprise capabilities, which in some cases may have been previously or separately implemented. In some cases, these existing application may be developed as commercially available applications and services. In these embodiments, the work order management and dispatch application may function to integrate these existing applications to the disclosed systems through the API 120, for example.

In embodiments, the work order management and dispatch application may be structured and/or configured to facilitate generation and management of a work order related to a particular mission or operational objective. For example, in some implementations, the work order management and dispatch application may be configured to receive an input from a user specifying a particular operational objective (e.g., inspect an asset at a particular site, map a terrain at a particular location, inventory natural resources in a particular area, etc.). The work order management and dispatch application may interface with API 120 to provide such operation objective data to server 110, which may then be processed in accordance with aspects of the present disclosure to generate advisory information relevant to work order generation and management. For example, the operational objective data may be used to determine whether the operation objective can be achieved with an available UAS resource (e.g., a drone), and/or whether it is feasible or even advisable to perform the mission using the UAS resource (e.g., the mission using the UAS resource may cost too much or may take too long in comparison with other available methods of achieving the operational objective). The operational objective data may also be used to determine the information that will be used to generate a work order (e.g., details about the UAS resource, time of mission, location, weather information, etc.) and what is needed to execute the work order (e.g., type of drone to be used, technology to be used, operational waivers, regulatory requirements to be met, etc.). In some embodiments, the work order management and dispatch application interacts and cooperates with a flight operations application (described below) to enable a user to obtain the work order and to execute the work order in accordance with operation objectives and constraints. In one particular example, e.g., in which a data objective may be desired, a particular model (e.g., a 3-D model) of a particular asset may be desired. In this case, a system implemented in accordance with the present disclosure may be leverage work order management and dispatch application functionality, the API (e.g., API 120), and the functionality of the various components as described herein to perform location analytic based on a query of the asset's location data from the backend functionality, based on the equipment type required for the data gathering, and/or based on a correlation and analytic performed by the system in order to generate a work order based on the results. Further details about the operation of the work order management and dispatch application will be discussed in reference with the example illustrated in FIG. 3 discussed below.

In some embodiments, UI apps 130 may include a flight operations application, which may be an application, a webpage, a standalone program, etc. The flight operations application may be structured and/or configured to enable an operator to obtain and/or view a work order and to facilitate execution of the work order. In some embodiments, the work order may be presented via a display to an operator who may view the particular details of the operational objective to be accomplished as detailed in the work order. In some embodiments, the flight operations application may interface with other systems that may have more direct control of the UAS resource (e.g., flight control applications) and may facilitate execution of the operation objective by providing information to flight control applications or systems so that the UAS resource may be controlled to perform the operational mission. In embodiments, the flight operations application may also provide real-time or near real-time information about flight operations status which may indicate the status of the flight mission. In embodiments, the flight operations application may also allow an operator to make real-time changes or adjustments to the operational objective based on events which may enable the operator to react to real-time events during the flight mission. Further details about the operation of the flight operations application will be discussed in reference with the example illustrated in FIG. 3 discussed below.

In some embodiments, UI apps 130 may include a data maintenance web application, which may be an application, a webpage, a standalone program, etc. The data maintenance web application may be configured to enable a user to perform operations for maintaining the data in the various databases of system 100. The data maintenance web application may allow a user to update, modify, verify, etc., the data in the databases, as well as to perform integration operations to ensure that system 100 has access to necessary or relevant databases. In embodiments, the data maintenance web application may additionally or alternatively enable users to collate portions of data provided by the system of embodiments, and to export the data to third party or additional systems that may provide further functionality, including various post processing operations to create new data/data sets, models, and analysis, which may be then be provided to the system of embodiments and stored as new data to be managed within the data storage provided and described herein.

Server 110 may be configured to receive information from UI apps 130 and to apply processes and features to provide automated control and management of UAS resources operations and coordination in accordance with embodiments of the present disclosure. As noted above, server 110, in particular, provides API-based tiered analytics and cross-reference processes that receive and analyze information related to UAS resources (e.g., operations, technologies, missions, etc.) and provide advisory, consulting, and planning features that allow a user to efficiently control and manage UAS resources usage requirements.

The functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. In some embodiments, server 110 may be implemented, wholly or in part, on an on-site system, or on a cloud-based system.

As shown in FIG. 1, server 110 includes processor 111, memory 112, databases 115-117, API 120, operational advisory engine 150, location analytics engine 160, technology analytics engine 170, mission operational relationships engine 180, and IT systems manager 190. It is noted that the various components of server 110 are illustrated as single and separate components in FIG. 1. However, it will be appreciated that each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

In some aspects, processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. Memory 112 may store instructions that, when executed by processor 111, cause processor 111 to perform operations in accordance with the present disclosure.

In aspects, memory 112 may also be configured to facilitate storage operations. For example, in some embodiments, memory 112 may comprise databases 115-117. In other embodiments, each of databases 115-117, or any combination thereof, may be part of a system external to system 100. In some embodiments, databases 115-117 may be integrated into memory 112, or may be provided as a separate module. In some aspects, database 113 may be a single database, or may be a distributed database implemented over a plurality of database modules. In some embodiments, database 113 may be provided as a module external to server 110.

In some embodiments, databases 115-117 may be configured for storing analysis data, models, classifiers, rankers, usage metrics, analytics, user preferences, definitions, mission data, asset data, regulatory information, and/or any data relevant to the generation and presentation of advisory data related to the utilization of UAS resources for performing flight missions to achieve particular operational objectives in accordance with aspects of the present disclosure.

In particular, database 115 may be configured to store information related to operational relationships. For example, database 115 may be configured to store industry definitions, which may include information and details on various industries. In addition, database 115 may store use case definitions that may provide information on potential situations in which a UAS resource may be used. Database 115 may also store mission type definitions. In embodiments, mission types may refer to as flight behaviors for a specific task. For example, a delivery operation may include a flight path that a drone may be to follow from a source location to a target location where were a payload may be delivered. In this example, the flight path may be a straight line or may include multiple segments to route around airspace, obstacles, other aircraft, or to fly through defined UAS corridors. The flight to and from the target location may be similar in that the objective is to travel between points routing as efficiently and safely as possible. In contrast, in another example, a data gathering mission over a construction area might consist of a series of "lawnmower" type passes over a given large area taking images rather than delivering a payload. Data gathering for items such as inspection of a vertical structure (e.g., a cellular tower) may also include different flight behavior. For example, rather than flying a lawnmower pattern, a flight asset (e.g., a drone) may fly in a circular patter around a given asset, taking images and readings of the asset using its sensors. A use case, as used herein, may refer to how and when a flight asset (e.g., a drone) may be used (e.g., a delivery, a data gathering operation, a persistent monitoring of a situation, etc.). In embodiments, one use case may have multiple mission types within it, for example, to gather data, drop a payload, take action (e.g., put out a fire), etc.

Database 116 may be configured to store regulatory and compliance definitions that may assist the analytics engines (e.g., location analytics engine 160 and technology analytics engine 170) to perform analysis to provide advisory data. This regulatory and compliance definitions may facilitate determination of regulatory requirements that may be integrated and/or used in the generation of the advisory data. For example, database 116 may store information on existing Federal Aviation Administration (FAA) regulations, proposed FAA regulations, state and local ordinances, etc.

Database 117 may be configured to store sensor and platform definitions that may assist the analytics engines (e.g., technology analytics engine 170) to perform analysis to provide advisory data. This sensor and platform definitions may facilitate determination of technology requirements and/or determination of feasible or advisable technology to be used in a particular flight mission to achieve a particular operational objective. Database 117 may store data obtained from industry technology news and updates, vendor and partner technology updates, product specifications and manuals, technology reviews, etc.

IT systems manager 190 may comprise a database for storing asset data, such as data on the physical specifications of UAS resources and available technology, IT data, and other data related to the flight asset. In embodiments, different asset data sets may be considered by systems implemented in accordance with aspects of the present disclosure. In some cases, a data set of the individual equipment assets for flight operations (e.g., drones, sensors, etc.) may have to be considered. In some cases, a set of target assets that an individual asset (e.g., a drone, a sensor, etc.) may be used to observe, inspect, etc. (e.g., distribution poles, transformers, oil refinery equipment, flair stacks, transfer stations, antenna installations, etc.). In embodiments, the set of target assets may be one that may drive API level integration with a target organization's IT systems. In these cases, data related to the target assets may be stored (e.g., within the organization's IT systems). As such, a system of embodiments may information about a target assets, such as a location, a type, size, position, operating status, and/or various other information and/or individual data points. The target asset's information may be used in preparation to gather more data or inspect that particular target asset. In some embodiments, after a flight mission, such as to gather data about a target asset, the target asset's tag number may be used in post-flight management to process analyze, and/or stored the collected target asset's data. In addition, IT systems manager 190 may be configured to provide management and integration of data related to existing IT and OT systems into system 100. In some embodiments, IT systems manager 190 may provide an API that may be used by system 100, or components thereof such as operational advisory engine 150, to access and obtain the data in the database.

As noted above, server 110 may include API 120. API 120 may be configured to provide access to the features of server 110 via a collection of programmatic calls. API 120 may enable an operator, user, or another system, such as via network 140 or UI apps 130, to perform dispatch operations, UAS resources fleet management, planning, event management, etc. In a sense, API 120 is the entry point into the features provided by server 110. API 120 may be a single API, but in some embodiments, API 120 may be a collection of several APIs that provide access to the various engines of server 110. For example, API 120 may include an API for each of the various engines of server 110, or an API for the various features and functions. In this case, API 120 may be considered an API manager.

Operational advisory engine 150 may be configured to provide functionality that enables an improved solution to the problem of obtaining effective and efficient advisory data with respect to UAS resources. The operational advisory engine 150 is configured to analyze the data provided and data stored, in cooperation with location analytics engine 160, technology analytics engine 170, and mission operational relationships engine 180, to provide a multi path relational and artificial intelligence driven advisory data, which may be in the form of a set of answers to questions asked both by human users as well as systems such as work order management, dispatch, routing/logistics, and asset management systems, in accordance with aspects of the present disclosure.

In particular, operational advisory engine 150 may provide features that include providing location analytics impact analysis (e.g., by leveraging the functionality of location analytics engine 160 described below). Location analytics impact analysis may comprise performing image analytics on images of a location, area, or site related to the operation objective. The image analytics may be performed using proprietary and/or third-party systems (e.g., performing image analysis on Mapbox or Google Satellite images). In embodiments, the image analytics may include determining the operating area based on the target asset's location or flight sight/route that would be required to perform the flight mission. The target asset may be an asset that is to be inspected, or observed, or may be a site, location, or area that needs to be inspected, observed, inventoried, etc., using a UAS resource (e.g., a drone). Once the operational area has been identified, operational advisory engine 150 may retrieve satellite map image or tiles, expanded to maximum zoom, of the defined operational area. Operational advisory engine 150 may then perform image recognition within the images or tiles to identify particular details. For example, image recognition may identify overhead wiring (including pole shadowing to indicate a partially visible utility pole), buildings, tall vegetation (e.g., trees/shrubs), sidewalks (which may indicate possibly high traffic pedestrian areas), sporting area/park areas (e.g., baseball diamonds or soccer fields). In some embodiments, once image recognition is performed, operation advisory engine 150 may perform, or cause to be performed, markup operations to highlight outlines and mark up the image or tile with obstacles and estimated altitudes for the various obstacles.

In some embodiments, location analytics impact analysis provided by operational advisory engine 150 may also include analyzing sectional charts related to the location of interest (e.g., the operating area) and determining airspace requirements. In some embodiments, determining airspace requirements may include determining required waivers, any required authorizations (e.g., using Low Altitude Authorization and Notification Capability (LAANC) services), and any other compliance requirements. In embodiments, location analytics impact analysis provided by operational advisory engine 150 may further include obtaining and analyzing any weather forecast for the area of interest in order to determine and predict conditions and average conditions, which may help determine operating parameters for the flight mission, such as wind rating and water resistance requirements for flight equipment, battery degradation and flight time percent adjustment recommendations, etc.

In embodiments, operational advisory engine 150 may be configured to provide technology requirement analysis (e.g., by leveraging the functionality of technology analytics engine 170 described below). The technology requirement analysis may enable operational advisory engine 150 to determine what sensors or equipment and/or what processes may be required for a flight mission based on an inspection type related to the operational objective. For example, a flight asset or resource type may be cross-referenced (e.g., based on a location of the UAS resource, or based on an asset tag of the UAS resource, or from a statement of asset type in a work order field input) against an inspection type stored in the asset description database (e.g., database of IT systems manager 190) for particular use cases to determine if the UAS resources is available and able to perform the inspection type under the use case. For example, a particular type of drone may be cross referenced to determine if the drone can be used to perform a thermal imaging inspection of a particular pipe. In some embodiments, the cross-referencing may provide sensor and process requirements by inspection type as data by operational advisory engine 150.

In embodiments, operational advisory engine 150 may further be configured to provide asset-location-mission correlation (e.g., by leveraging the functionality of mission operational relationships engine 180 described below). The asset-location-mission correlation features of operational advisory engine 150 enable cross-referencing mission types based on UAS resource use cases against technology requirements and location requirements. In this manner, a determination may be made as to whether a particular UAS resource has been previously used to perform a mission based on a particular inspection type. Where a previous mission has been designed, the data on that mission design may be used to augment the advisory data of a present mission. Where a previous mission for particular UAS resource and a particular inspection type has not been designed, a new mission plan may be generated. The new mission plan may be created using the previously identified UAS resource location, the inspection type, any identified obstacles and airspace requirements, any identified technology requirements. In some embodiments, the new mission plan may be inclusive of an operator's autonomous flight plan script. In embodiments, the new mission plan may employ marked up images for obstacles and altitudes, and may adjust the flight plan for obstacle avoidance.

In embodiments, operational advisory engine 150 may further be configured to provide mission end-to-end requirements and dispatch advisory. In embodiments, a dispatch advisory and mission requirements script may be generated and provided to dispatch management and work order management systems. In some cases, this functionality may include generating a date/timestamped report that may be stored in databases 115-117. In embodiments, the date/timestamped report may include compiled results about the operating location, the location and type of the UAS resource, any technology and/or sensor to be used, mission type, requirements, compliance, and execution recommendations. In embodiments, queries received via API 120 for a dispatch advisory and mission requirement may be fulfilled based on the latest or time stamp requested report.

Location analytics engine 160 may be configured to provide functionality that integrates visual analytics and AI analysis to analyze a location and provide recommendations for flight parameters, planning, and even autonomous flight routing. The features of location analytics engine 160 may facilitate the generation of warnings and obstacle elements that may be provided to the operational advisory engine, and in some embodiments may also be presented as a visual map for the pilots/operators executing the flights.

In particular, location analytics engine 160 may be configured to perform impacting weather and typical climate analysis. This impacting weather and typical climate analysis may provide current and projected weather relevant to a flight mission, as well as typical conditions to expect based on the location and requested date/time of the flight mission. In order to provide this impacting weather and typical climate analysis, location analytics engine 160 may obtain weather reports for the current and time and/or the target date time of the flight mission. The weather reports may include precipitation, wind, temperature, cloud cover, etc. The weather reports may be obtained from open source reports, services-based reports, aviation meteorological aerodrome reports (METARs), micro-climate data reports, etc. The data obtained from the various reports may be aggregated and/or combined by location analytics engine 160 into a combined report. In generating the combine report, location analytics engine 160 perform a combination of averaging like-for-like services, and correlating with METAR weather taking into account location differences, as well as overlaying micro climate data to generate a map based view showing the correlated forecast and a historical average overlaid on each other. Location analytics engine 160 may then generate an impact report, which may include flight path and flight time assumption changes due to temperature, wind, elevation, precipitation, visibility, and cloud elevation, as determined by the impacting weather and typical climate analysis, as well as any rescheduling recommendations for severe or no fly weather.

Location analytics engine 160 may further be configured to provide image analytics environment, structures, anticipated foot traffic, etc. This image analytic may include analysis of satellite imagery of the location of interest (e.g., the operating location of the flight mission). In embodiments, the image analytics feature of location analytics engine 160 may be performed by applying detection algorithms to satellite imagery tiles within the mission area to identify buildings, pedestrian walkways, vertical structures, rough vegetation, usable paved areas, etc. In addition, in one particular example, the operating location may be cross-referenced using mapping services (e.g., for local businesses and business types) against identified pedestrian walk ways to produce a foot traffic density and likelihood index that accounts for stated business hours, in order to determine anticipated foot traffic.

Location analytics engine 160 may further be configured to provide analysis of the terrain, altitude, and typical KP/Sat index. This analysis facilitates evaluation of risks associated with terrain changes, altitudes required, and typical reliability for positioning services. In providing this features, location analytics engine 160 may be configured to obtain average KP/Sat visibility from a previous period of time (e.g., the previous 30 days, or the available history windows) from external services, such as the National Oceanic and Atmospheric Administration (NOAA). This data may be used to generate a typical reliability and risk score based on 1-10 scale. In embodiments, the data obtained may be used to determine any elevation change within the operating area. The elevation changes determined may then be used to provide a risk score. In some embodiments, location analytics engine 160 may obtain terrain map data and convert such data into an elevation grid for the specified operating area, to be used for mission planning.

Location analytics engine 160 may further be configured to provide airspace regulatory requirement analysis. Location analytics engine 160 may perform this analysis by evaluating the airspace of the operating location (e.g., using external airspace mapping services) and may use the resulting data to generate warnings, requirements, and location data. In particular, in some embodiments, location analytics engine 160 may be configured to determine airspace classification, locations, and warnings associated with the operating location. Location analytics engine 160 may also be configured to determine any authorization and/or waiver requirements associated with the airspace of the operating location. In some embodiments, location analytics engine 160 may include functionality to interface with LAANC services in order to request any authorization that is determined to be needed for the airspace of the operating location. Further, in some embodiments, location analytics engine 160 may be configured to determined global position system (GPS) points for any geofencing and no-fly-zone restrictions that are to be input into the mission planning.

Technology analytics engine 170 may be configured to provide functionality that performs analysis on mission, environment, end data requirements, and operating location, along with regulatory definitions, in order to suggest which type of UAS resource (e.g., drone) platform or system, and which additional technology (e.g., sensors, payload, etc.), should be used for a particular mission on a particular operating location to achieve a particular operational objective. In particular, technology analytics engine 170 may provide use case and mission type sensor requirement analysis. This analysis may be configured to correlate a use case and/or mission type in order to determine sensor requirements. Sensor requirements may include data that indicates what sensors or payload would the minimum requirements to accomplish the operational objective at the location of interest. In embodiments, sensor requirements may be identified by technology analytics engine 170 using correlation and relational data to identify data types of sensors required by use case and mission type. For example, relational data from data types (of sensors) and use case may be used to recommend data resolution and accuracy requirements of sensors. In some embodiments, resulting data types and resolution of may be used to identify sensor options and identify gaps in available sensor equipment Technology analytics engine 170 may be configured to provide mission type and sensor type to platform requirement analysis. This analysis may be configured to analyze a mission type, as well as results from the sensor requirement analysis described above, to determine platform requirements and recommendations. In embodiments, platform requirements may be identified by technology analytics engine 170 using sensor specifications, including both physical hardware as well as interface and software requirements, obtained from relational data. In this case, compatible/recommended UAS resource platform types may be identified. In some embodiments, the mission type and sensor/platform list identified may be used to generate a filtered set of platform requirements and compatible known platforms.

Technology analytics engine 170 may be configured to provide mission type and location to platform requirement analysis. This analysis may be configured to analyze the filtered platform list generated by the mission type and sensor type to platform requirement analysis described above, and to apply mission type and location filters in order to further enhance the platform recommendations. In embodiments, technology analytics engine 170 may retrieve requirements for a mission type in a particular location (inclusive of airspace location data), as well as any compatible platforms identified before, to produce a further refined list of platforms and sensors based on location restrictions (e.g., inclusive of airspace, weather, environment, etc.).

Technology analytics engine 170 may be configured to provide regulatory and location to platform requirement analysis. This analysis may be configured to analyze the airspace of the operating location to further refine the platform and sensor recommendations. In particular, in some embodiments, technology analytics engine 170 may be configured to determine airspace classification, locations, and warnings associated with the operating location. Technology analytics engine 170 may also be configured to determine any authorization and/or waiver requirements associated with the airspace of the operating location. These determination may be used by technology analytics engine 170 to further enhance and refine platform and sensor recommendations, as well as any additional requirements/recommendations (such as parachute, sense and avoid systems, or other feature/functional requirements) based on identified waiver/authorization/classification/warnings.

Mission operational relationships engine 180 may be configured to provide functionality that correlates various types of data to identify relationships. This functionality is particularly useful as it allows system 100, e.g., via operational advisory engine 150, to identify various types of data that may be used by the analytics engines to identify flight mission requirements. In particular, mission operational relationships engine 180 may be configured to provide correlation of industry to use case to mission type data. This type of analysis may allow mission operational relationships engine 180 to identify relational data on mission types and use cases that include particular industry tags. In embodiments, correlation of industry to use case to mission type data may be performed by searching available databases (e.g., database 115) for use cases by industry tags. The result may be identification of mission types by use case. This data may be used to identify other requirements, as described above. In embodiments, this functionality also allows use case reverse lookup to identify industries where particular use cases may be applicable, and may also allow generation of mission type listings by use case and industry.

Mission operational relationships engine 180 may be configured to provide industry to regulatory correlation functionality. In particular, mission operational relationships engine 180 may be configured to cross-reference industry specific regulatory requirements and standards. For example, industry regulatory requirements may be searched for data gathering, management and handling. In addition, industry and location specific regulatory safety requirements may also be searched and obtained.

Mission operational relationships engine 180 may be configured to provide industry data type and compliance impact analysis. In embodiments, specific industries and use cases related to those industries may require data of specific types (e.g., non-destructive visual inspections for agriculture applications or vertical 3D models for tower inspections), while other industries may require geological surveys (e.g., for a construction excavation site, or a photogrammatic model of a building in architectural instances.) This analysis may include cross-referencing mission types based on use cases against technology requirements and location requirements. For example, for a specific UAS resource type, all typical uses cases may be identified by this analysis, and the resulting data may include data types, capture techniques, and required mission type for each of the UAS resource type. In some embodiments, for a given UAS resource type, or mission type, or both, capture technology requirements and location requirements (e.g., clear overhead area, side on space, visible from above/side/below) may be generated by this analysis.

Figure 2:
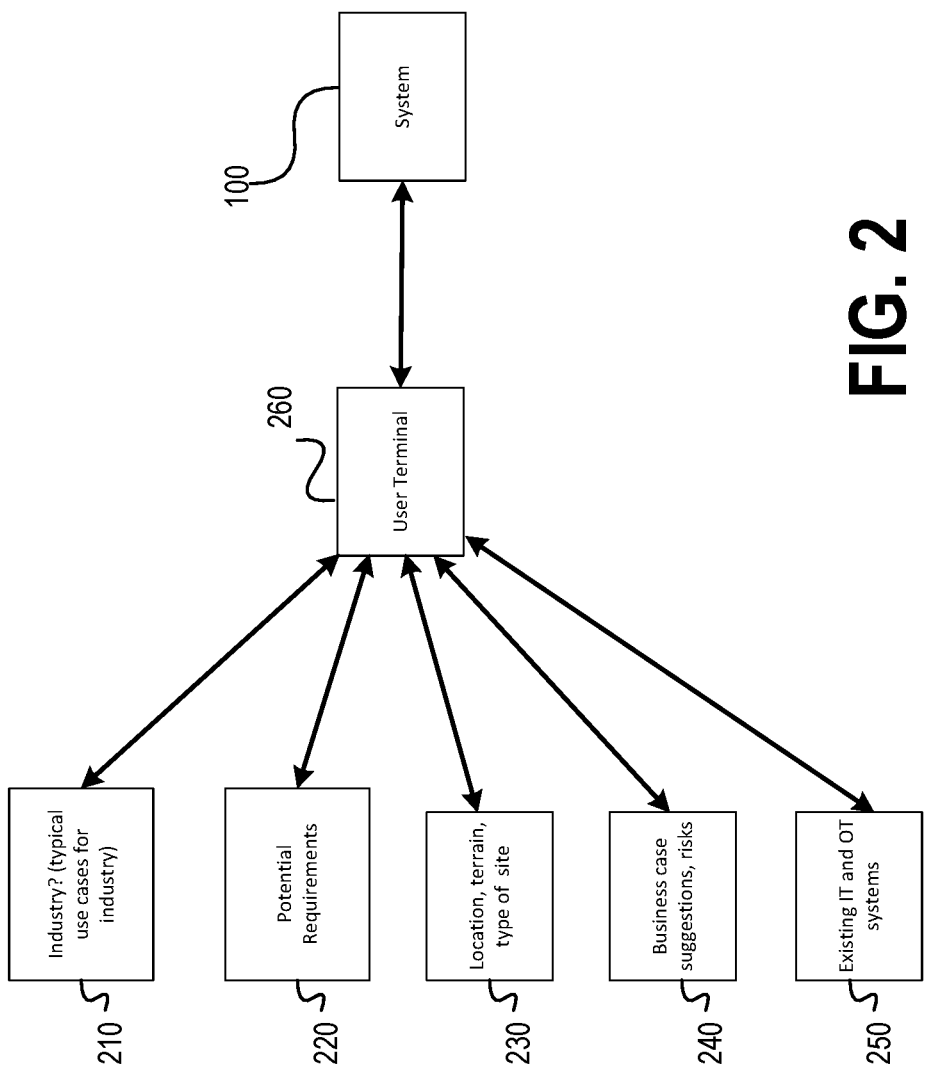
FIG. 2 is a block diagram illustrating an example of operations in accordance with embodiments of the present disclosure.

Referring to FIG. 2, a block diagram illustrating a broad example of setup and management functionality provided by a system configured for automated control and management of UAS resources operations and coordination in accordance with embodiments of the present disclosure is shown. It is noted that the functionality described with respect to the example illustrated in FIG. 2 may be provided by a system such as system 100 described above. Indeed, the example illustrated in FIG. 2 is shown as using system 100.

In the example illustrated in FIG. 2, a user may use user terminal 260 to provide inputs and queries that are transmitted to system 100. In particular, as shown in block 210, a user may provide information on a relevant industry. For example, the user may provide what industry the user is working in. In this example, a selectable list of typical use cases that exist for cross section of both industries and remainder list as individuals may be provided to the user. In this example, the industry information may be provided to system 100. System 100 may provide analysis of the data, and may determine, in this example, that particular industries have a number of associated use cases, which may cross reference to a number of common use cases. For example, the industries of construction and land survey may have 7 and 9 associated use cases respectively, which may be cross-referenced 5 use cases in common. In this example, system 100 may return a sorted list of the 5 common use cases, and the remaining 11 use cases are each individually tagged with the respective industry. Return sorted list of 5 in common and remaining 11 each tagged with industry. In addition, in this example, the identified use cases each have different value and cost levels. In this case, a tentative selection of the cases desired would show a table of typical drone cost savings over traditional methods and high level costs of operating drones for each use case. In this example, each use case provided to the user may have a clickable description of what the operation involves, an example output, and a linked set of analytic and analysis tools and types as well as commercial applications that can be used.

Following this example, as shown at block 220, the user may be presented with potential requirements. The potential requirements may include types of equipment required, pilot certifications, and waivers and authorizations required. In addition, the user may be presented with software and processing service recommendations. For example, the user may be presented with a linked list of technologies and associated typical costs per device along with manufacturer listings and images/examples of the hardware, and/or a linked list of associated software technologies and additional hardware requirements (e.g., the user may be presented with a message: "You need an iPad with iOS v10 to run this drone.") In some embodiments, the user may be presented with regulatory and compliance information. For example, the user in this example may be presented with typical waivers types required by industry and use case type (e.g., the user may be presented with a message: "Construction needs 107.39 for flying over people on a construction site.") The user may also be presented with descriptions of operational requirements for briefings, safety procedure types required, documentation, etc., and location based regulatory requirements.

Following the example illustrated in FIG. 2, as shown at block 230, the user may be presented with a query regarding location, and may be provided with information on the location and the terrain. For example, the user may be presented with the question "where are you operating?" Based on this, system 100 may determine geographic and location-based regulatory requirements. For example, in some embodiments, the user may be presented with regulatory and compliance information. For example, the user in this example may be presented with typical waivers types required by industry and use case type (e.g., the user may be presented with a message: "Construction needs 107.39 for flying over people on a construction site.") The user may also be presented with descriptions of operational requirements for briefings, safety procedure types required, documentation, etc., and location based regulatory requirements In addition, system 100 may determine climate, terrain, technology, and operational impacts. For example, weather tolerance and impacts on flight operations (e.g., reduced flight time in these locations for temperature, reduced flight performance in Denver because of altitude, etc.) may be determined and presented to the user. Additionally, in this example, further location-based determinations may be made such as airspace requirements around airports, military locations, or protected locations such as schools or large public event spaces. Also, obstacles, buildings, foliage, power lines, cell towers, recreational air use, and other impeding environmental conditions may be determined based on location information.

Further following the example illustrated in FIG. 2, as shown at block 240, business case suggestions and risks may be provided and presented to the user. For example, risks may be identified based on operating location or location type, and also based on operational type, and risk management recommendations may be provided to the user. In this example, business cases and budgetary guidance for standing up and running operations by use case and operation type may also be provided to the user. As shown at block 250, operational integrations points with typical existing IT and OT systems and processes may be provided to the user. In particular, system 100 may recommended IT, OT system level integrations. For example, system 100 may recommend a particular incident management system, a particular ticket management system, a particular SAP, and associated integration points within them.

Figure 3:
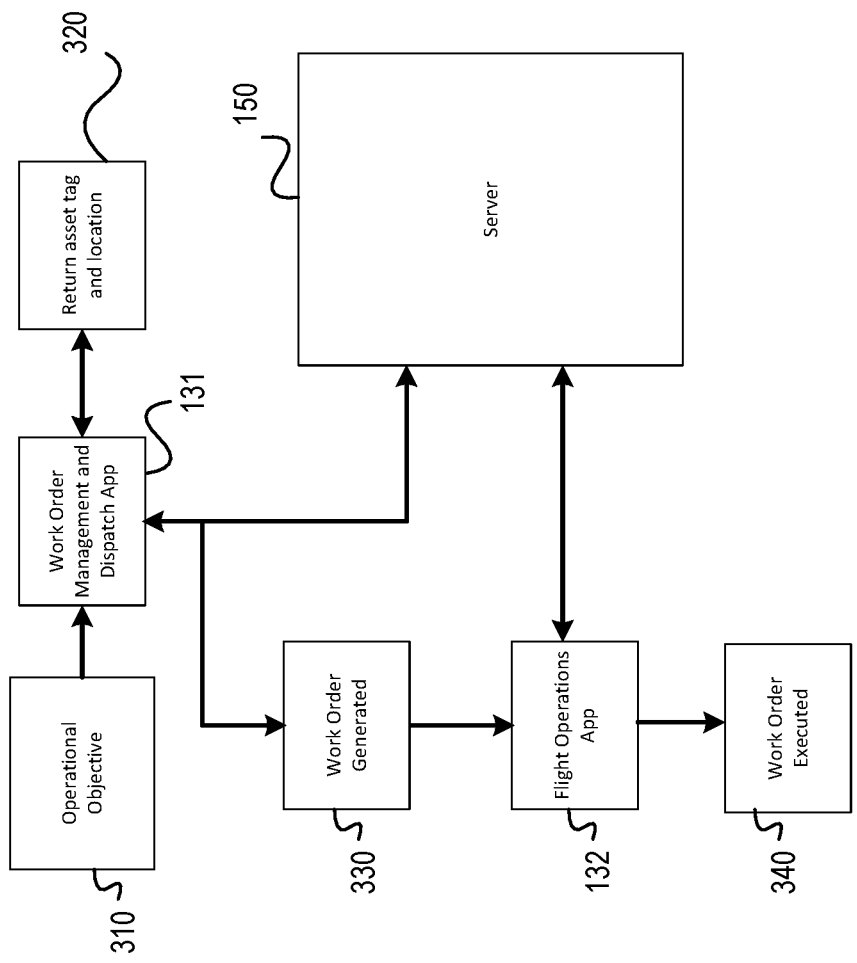
FIG. 3 is a block diagram illustrating another example of operations in accordance with embodiments of the present disclosure.

Referring to FIG. 3, a block diagram illustrating a specific example of a use case scenario using functionality provided by a system configured for automated control and management of UAS resources operations and coordination in accordance with embodiments of the present disclosure is shown. It is noted that the functionality described with respect to the example illustrated in FIG. 3 may be provided by a system such as system 100 described above.

In this example, at block 310, a user may provide information regarding an operational objective. For example, a user may input information indicating that the user is a building asset manager and desires to inspect a roof on an Ann Arbor factory. In his example, the information provided by the user may be input via work order and management dispatch application 131. At block 320, the information provided at block 310 may be analyzed and an asset tag and location information may be identified and provided to work order and management dispatch application 131.

The information obtained at block 320 may be provided to server 150 for analysis and to obtain a dispatch advisory. In particular, the user may desire to know whether the operational objective can be performed with a drone, and the particular requirements that should be included in a work order (e.g., technological, operational, and regulatory requirements). Server 150 may analyze this information in accordance with the description above. In particular, functionality of the operational advisory engine, the location analytics engine, the technology analytics engine, and the mission operational relationships engine may be leveraged to determine the advisory data.

For example, the location analytics engine may determine that a cold weather drone that tolerates wind is required, and that there will be pedestrians. The location analytics engine may also determine any buildings around the target asset to avoid, and whether there are any airspace restrictions. Furthermore, the location analytics may determine that there are compliance restrictions such that post dusk, a 107.29 daylight waiver is needed, and that since the flights will be over people require, a 107.39 over people waiver is needed. The mission operational relationships engine may determine that roof Inspections mean visual and thermal inspections, that longer flights are required when high resolution is needed, that two flights pre and post dusk are needed, and that there are no industry regulations. The technology analytics engine may determine that a visual camera and a thermal camera are needed to inspect the building. As such, the technology analytics engine may determine that a larger platform drone is needed to be able to carry both sensors. Thus, in cooperation with the location analytics engine, the technology analytics engine, and the mission operational relationships engine, the operational advisory engine may determine advisory data that includes recommendations for a large platform drone with thermal and visual cameras, which also needs to be to be 107.29 compliant for nav lighting and carry a parachute system for 107.39 compliance 'over people operations.' In addition, the advisory data provided by the operational advisory engine may indicate that the flight mission will need a pilot with 2 waivers for operations and require a visual observer (2nd person for vertical line of sight).

The advisory data provided by server 150 may be provided to work order and management dispatch application 131, which uses the information to generate a work order at block 330. The work order is the provided to flight operations app 132, which may be used to manage, control, and monitor execution of the work order at block 340.

Figure 4:
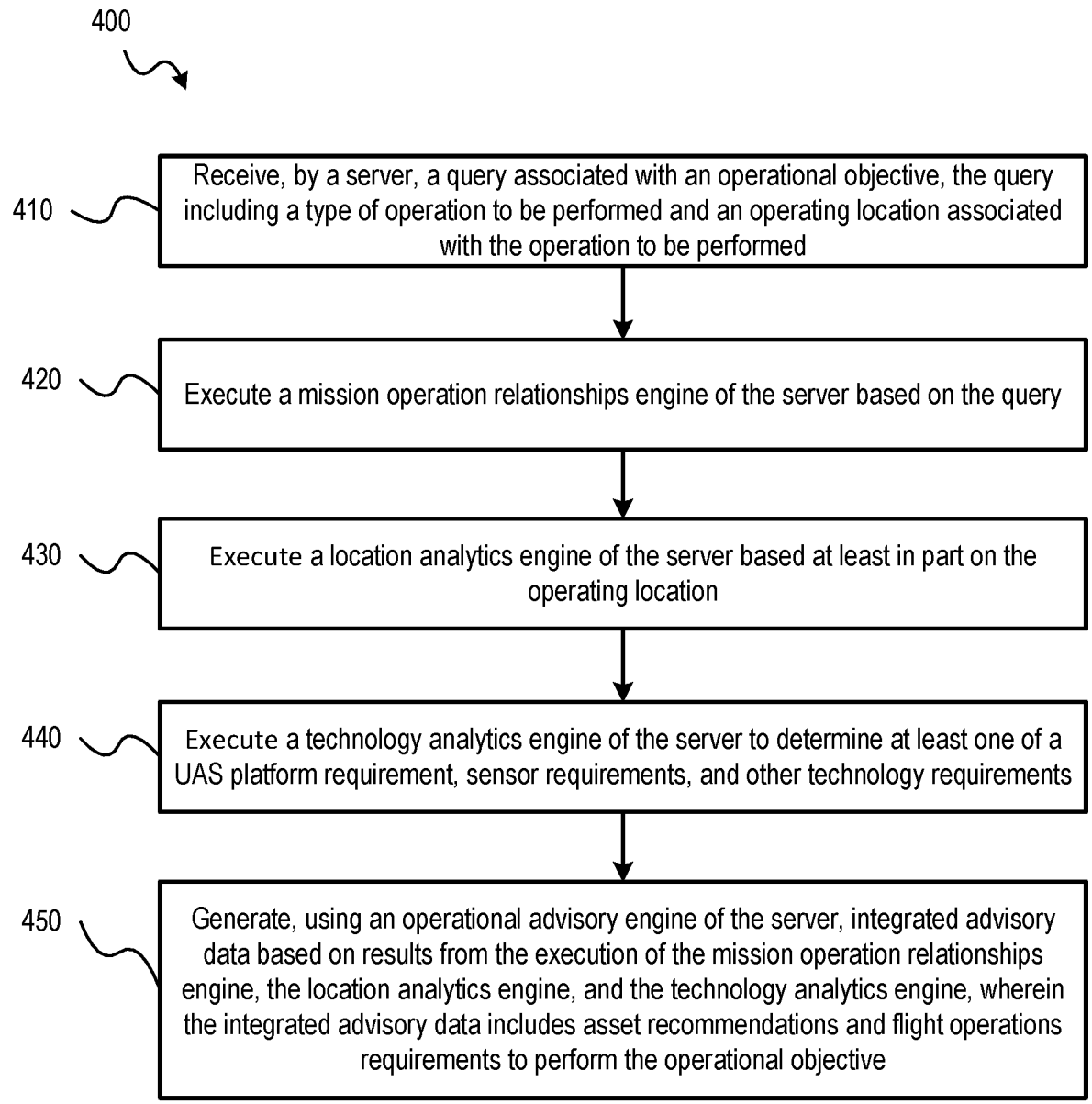
FIG. 4 is a flow diagram of a method for providing automated generation of advisory and guidance data for UAS operations in accordance with embodiments of the present disclosure.

Referring to FIG. 4, a flow diagram of a method for providing automated control and management of UAS resources operations and coordination in accordance with embodiments of the present disclosure is shown. In aspects, the operations of the method 400 may be stored as instructions that, when executed by one or more processors (e.g., the one or more processors 111 of FIG. 1), cause the one or more processors to perform the steps of the method. In aspects, the method 400 may be performed by a device, such as server 110 of FIG. 1.

At step 410, the method 400 includes receiving, by a server, a query associated with an operational objective. In aspects, the query may include a type of operation to be performed and an operating location associated with the operation to be performed. In aspects, the server may be server 110 of FIG. 1. At step 420, the method includes executing a mission operation relationships engine of the server based on the query. In aspects, the mission operation relationships engine may be mission operation relationships engine 180 of FIG. 1. In aspects, executing the mission operation relationships engine may include correlating use cases associated with different industry types to generate a list of use cases that are common to the different industry types, identifying flight mission types based on the identified use cases, and determining flight operations compliance requirements based on the flight mission types and the location.

At step 430, method 400 includes executing a location analytics engine of the server based at least in part on the operating location. In aspects, the location analytics engine may be location analytics engine 160 of FIG. 1. In aspects, executing the location analytics engine may include identifying weather conditions at the operating location at a date and time of the operation to be performed, executing image analysis to images associated with the operating location to determine potential obstacles, identifying risks associated with terrain characteristics at the operating location, and determining authorization requirements associated with the operating location.

At step 440, method 400 includes a executing a technology analytics engine of the server to determine at least one of a UAS platform requirement, sensor requirements, and other technology requirements. In aspects, the technology analytics engine may be technology analytics engine 170 of FIG. 1. In aspects, executing the technology analytics engine may include determining the at least one of a UAS platform requirement, sensor requirements, and other technology requirements based on one or more of a use case associated with the operational objective, at least one of the identified mission types, the operating location, and regulatory requirements associated with airspace of the operating location.

At block 450, the method includes generating, using an operational advisory engine of the server, integrated advisory data based on results from the execution of the mission operation relationships engine, the location analytics engine, and the technology analytics engine. In aspects, the operational advisory engine may be operational advisory engine 150 of FIG. 1. In aspects, the integrated advisory data may include asset recommendations and flight operations requirements to perform the operational objective, as described above.

As can be appreciated from the description of FIGS. 1-4, the disclosed systems, methods, and computer-readable storage media may enable a modular system that provides tiered analytics for technical, process, business, operations, and compliance data that may be used to generate advisory data for UAS flight operations. In aspects, the disclosed systems and methods cross-reference data sets of industry, business, and individual use cases for the use of drones in commercial applications which facilitates generation of advisory data as the data used is experience and industry based data on technical and business level concerns for the use of unmanned drones in commercial applications rather than experimentation and technical PoCs as it is the case with existing systems. Moreover, rendering the available data and analytics API addressable allows both real time and pre-planning type uses, which enables various applications to be developed to leverage the data/analytics and provide value added services.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-4) may comprise processors, electronics devices, hardware devices, electronics components, logical circuits, memories, software codes, firmware codes, etc., or any combination thereof. In addition, features discussed herein relating to FIGS. 1-4 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 1-4) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for automated control of flight operations of an unmanned aerial system (UAS), the method comprising:
    receiving, by a server, a query associated with an operational objective, the query including a type of operation to be performed and an operating location associated with the operation to be performed;
    executing a mission operation relationships engine of the server based on the query,
        wherein executing the mission operation relationships engine includes:
            correlating use cases associated with different industry types to generate a list of use cases that are common to the different industry types;
            identifying flight mission types based on the identified use cases; and
            determining flight operations compliance requirements based on the flight mission types and the location;
    executing a location analytics engine of the server based at least in part on the operating location,
        wherein executing the location analytics includes:
            identifying weather conditions at the operating location at a date and time of the operation to be performed;
            executing image analysis, the image analysis executed on images associated with the operating location to determine potential obstacles;
            identifying risks associated with terrain characteristics at the operating location; and
            determining authorization requirements associated with the operating location;
    executing a technology analytics engine of the server to determine at least one of a UAS platform requirement, sensor requirements, and other technology requirements; and
    generating, using an operational advisory engine of the server, integrated advisory data based on results from the execution of the mission operation relationships engine, the location analytics engine, and the technology analytics engine,
        wherein the integrated advisory data includes recommendations on assets to use and flight operations requirements to perform the operational objective.

2. The method of claim 1, wherein the query is received from one of a user and an external automated system.

3. The method of claim 1, wherein the flight operations compliance requirements include regulatory requirements for using a recommended UAS platform with a recommended at least one sensor to perform the operation to be performed at the operating location.

4. The method of claim 1, wherein executing image analysis on images associated with the operating location to determine potential obstacles includes executing algorithms on image tiles of the operating location to identify at least one of building, pedestrian walkways, vertical structures, and vegetation.

5. The method of claim 1, wherein identifying risks associated with terrain characteristics at the operating location includes identifying risks associated with at least one of: terrain changes within the operating location, altitudes required to perform the flight operations within the operating location, and satellite reliability.

6. The method of claim 1, wherein executing the location analytics further includes providing an interface to obtain authorizations to meet the determined authorization requirements associated with the operating location.

7. The method of claim 1, wherein executing the technology analytics engine of the server to determine at least one of a UAS platform requirement, sensor requirements, and other technology requirements includes determining the at least one of a UAS platform requirement, sensor requirements, and other technology requirements based on one or more of: a use case associated with the operational objective, at least one of the identified mission types, the operating location, and regulatory requirements associated with airspace of the operating location.

8. A non-transitory computer-readable storage medium storing instructions that, when executed by one or more processors, cause the one or more processors to perform operations for automated control of flight operations of an unmanned aerial system (UAS), the operations comprising:
receiving, by a server, a query associated with an operational objective,
the query including a type of operation to be performed and an operating location associated with the operation to be performed;
executing a mission operation relationships engine of the server based on the query,
wherein executing the mission operation relationships engine includes:
correlating use cases associated with different industry types to generate a list of use cases that are common to the different industry types;
identifying flight mission types based on the identified use cases; and
determining flight operations compliance requirements based on the flight mission types and the location;
executing a location analytics engine of the server based at least in part on the operating location,
wherein executing the location analytics includes:
identifying weather conditions at the operating location at a date and time of the operation to be performed;
executing image analysis on images associated with the operating location to determine potential obstacles;
identifying risks associated with terrain characteristics at the operating location; and
determining authorization requirements associated with the operating location;
executing a technology analytics engine of the server to determine at least one of a UAS platform requirement, sensor requirements, and other technology requirements; and
generating, using an operational advisory engine of the server, integrated advisory data based on results from the execution of the mission operation relationships engine, the location analytics engine, and the technology analytics engine,
wherein the integrated advisory data includes recommendations on assets to use and flight operations requirements to perform the operational objective.

9. The non-transitory computer-readable storage medium of claim 8, wherein the query is received from one of a user and an external automated system.

10. The non-transitory computer-readable storage medium of claim 8, wherein the flight operations compliance requirements include regulatory requirements for using a recommended UAS platform with a recommended at least one sensor to perform the operation to be performed at the operating location.

11. The non-transitory computer-readable storage medium of claim 8, wherein executing image analysis on images associated with the operating location to determine potential obstacles includes executing algorithms on image tiles of the operating location to identify at least one of building, pedestrian walkways, vertical structures, and vegetation.

12. The non-transitory computer-readable storage medium of claim 8, wherein identifying risks associated with terrain characteristics at the operating location includes identifying risks associated with at least one of: terrain changes within the operating location, altitudes required to perform the flight operations within the operating location, and satellite reliability.

13. The non-transitory computer-readable storage medium of claim 8, wherein executing the location analytics further includes providing an interface to obtain authorizations to meet the determined authorization requirements associated with the operating location.

14. The non-transitory computer-readable storage medium of claim 8, wherein executing the technology analytics engine of the server to determine at least one of a UAS platform requirement, sensor requirements, and other technology requirements includes determining the at least one of a UAS platform requirement, sensor requirements, and other technology requirements based on one or more of: a use case associated with the operational objective, at least one of the identified mission types, the operating location, and regulatory requirements associated with airspace of the operating location.

15. A system automated control of flight operations of an unmanned aerial system (UAS), the system comprising:
a server having one or more processors and a memory communicatively coupled to the one or more processors,
wherein the one or more processors are configured to:
receive a query associated with an operational objective, the query including a type of operation to be performed and an operating location associated with the operation to be performed;
execute a mission operation relationships engine of the server based on the query, wherein executing the mission operation relationships engine includes:
correlating use cases associated with different industry types to generate a list of use cases that are common to the different industry types;
identifying flight mission types based on the identified use cases; and
determining flight operations compliance requirements based on the flight mission types and the location;
execute a location analytics engine of the server based at least in part on the operating location, wherein executing the location analytics includes:
identifying weather conditions at the operating location at a date and time of the operation to be performed;
executing image analysis on images associated with the operating location to determine potential obstacles;
identifying risks associated with terrain characteristics at the operating location; and
determining authorization requirements associated with the operating location;
execute a technology analytics engine of the server to determine at least one of a UAS platform requirement, sensor requirements, and other technology requirements; and
generate, using an operational advisory engine of the server, integrated advisory data based on results from the execution of the mission operation relationships engine, the location analytics engine, and the technology analytics engine, wherein the integrated advisory data includes recommendations on assets to use and flight operations requirements to perform the operational objective.

16. The system of claim 15, wherein the flight operations compliance requirements include regulatory requirements for using a recommended UAS platform with a recommended at least one sensor to perform the operation to be performed at the operating location.

17. The system of claim 15, wherein executing image analysis on images associated with the operating location to determine potential obstacles includes executing algorithms on image tiles of the operating location to identify at least one of building, pedestrian walkways, vertical structures, and vegetation.

18. The system of claim 15, wherein identifying risks associated with terrain characteristics at the operating location includes identifying risks associated with at least one of: terrain changes within the operating location, altitudes required to perform the flight operations within the operating location, and satellite reliability.

19. The system of claim 15, wherein executing the location analytics further includes providing an interface to obtain authorizations to meet the determined authorization requirements associated with the operating location.

20. The system of claim 15, wherein executing the technology analytics engine of the server to determine at least one of a UAS platform requirement, sensor requirements, and other technology requirements includes determining the at least one of a UAS platform requirement, sensor requirements, and other technology requirements based on one or more of: a use case associated with the operational objective, at least one of the identified mission types, the operating location, and regulatory requirements associated with airspace of the operating location.

* * * * *